United States Patent
Ferris et al.

[11] 3,761,199
[45] Sept. 25, 1973

[54] HELICOPTER ROTOR WITH REDUNDANT LOAD CARRYING CAPABILITY

[75] Inventors: Donald L. Ferris, Newtown; Robert Zincone, Norwalk, both of Conn.

[73] Assignee: United Aircraft Corporation, East Hartford, Conn.

[22] Filed: July 14, 1972

[21] Appl. No.: 272,087

[52] U.S. Cl.................. 416/134, 416/141, 416/244
[51] Int. Cl............................................ B64c 27/38
[58] Field of Search.................... 416/134, 141, 244, 416/245

[56] References Cited
UNITED STATES PATENTS

| | | | |
|---|---|---|---|
| 2,573,875 | 11/1951 | Riddiford | 416/208 X |
| 2,765,859 | 10/1956 | Hartzell et al. | 416/207 |
| 3,292,712 | 12/1966 | Schmidt | 416/239 |
| 3,501,250 | 3/1970 | Mosinskis | 416/140 |
| 3,700,352 | 10/1972 | Gorndt | 416/134 |

FOREIGN PATENTS OR APPLICATIONS

| | | | |
|---|---|---|---|
| 826,519 | 1/1960 | Great Britain | 416/134 |

Primary Examiner—Everette A. Powell, Jr.
Attorney—Vernon F. Hauschild

[57] ABSTRACT

A helicopter rotor in which the helicopter blades are mounted for rotation from a rotor hub which is shaped to provide redundant load carrying paths for blade centrifugal loading, torque loading, thrust loading and rotor head moment loading.

10 Claims, 4 Drawing Figures

HELICOPTER ROTOR WITH REDUNDANT LOAD CARRYING CAPABILITY

BACKGROUND OF THE INVENTION

1. Field of the Invention

This invention relates to helicopter rotor heads and more particularly to such rotor heads which have hubs having redundant load carrying capability so that failure of a portion thereof does not prevent the helicopter rotor from continuing to operate.

2. Description of the Prior Art

In the prior art construction of helicopter rotor heads, the rotor head consisted of monolithic blade retention mechanisms, wherein a failure of the monolithic blade retaining mechanism eliminates the load carrying capability of at least that portion of the rotor. Examples of such monolithic rotor head constructions are shown in U.S. Pat. Nos. 3,428,132; 3,589,835; 3,409,249 and 3,101,785. There is another group of prior art, such as Holmes U.S. Pat. No. 1,923,054; Bocksruker U.S. Pat. No. 1,797,068; McLimore U.S. Pat. No. 3,572,969 and Glucksman U.S. Pat. No. 3,551,070 which utilize circular rings in rotor constructions for rotors which are intended to operate at an extremely high rpm and which include loaded webs, spokes and flanges between inner and outer rings, so that the spoke members are loaded by centrifugal force during the normal operation of the rotor, contrary to the teaching of our invention, and so that the circularly shaped outer ring must be made very heavy to retain its shape under load in this high speed application.

These prior art rotors which utilize outer members and spoke members in connection with central hub members is intended for use with very high rotational speed equipment in which a circular outer hoop is necessary to carry the rotor loading. The circular outer hoop of this prior art must be made very rugged so as to be able to carry its own mass in view of its high speed operation in addition to attachment blade loads. The high speed prior art constructions require the outer hoop member to hold the entire unit together, but because the outer hoop would lose its shape due to blade imposed centrifugal forces acting thereon, unless it had very high strength, it is necessary to increase the weight of the circular outer hoop to thereby increase its strength as required. Contrary to the high rotational speed environment of the prior art, the teaching of this application is intended for use with much lower rotational speed environments but with very highly concentrated blade imposed centrifugal loads at discrete points on the rotor. We accordingly avoid using a circular outer ring member because such a circular outer ring member would go out-of-shape under concentrated blade centrifugal loading. We use straight side members between our high concentrated centrifugal load stations because such straight sides, when joined, form a multi-sided truss, thereby keeping the full centrifugal loading in straight-line loaded elements forming the periphery of the hub. The importance of our straight sides in our truss is that the loads which are imparted from the blade to the outer, straight sided truss member extend along the straight sides of the truss member and therefore do not serve to try to change the shape of that straight side. If we had made our outer truss circular in form, a very high concentration of loads at selected stations around the circle would be directed to cause the ring to go out of its circular shape and in so doing would impart loading to our central spokes and our inner hub member.

SUMMARY OF THE INVENTION

A primary object of the present invention is to provide a helicopter rotor having a hub with redundant load carrying capabilities consisting of a truss shaped outer support which carries all blade centrifugal loading so to relieve centrifugal loading from the spokes and central hub ring member.

In accordance with the present invention, the hub spoke members cooperate with the outer support in carrying normal torque, thrust and rotor head moment loading.

This invention permits the complete unloading of the blade central hub of the effects of blade centrifugal loads, thereby permitting this highly stressed central member to more reliably perform its other functions.

In accordance with the present invention, the outer support member of the rotor head is actually a truss member comprising at least three straight sides so as to take all blade centrifugal loading, thereby relieving the spokes of the hub and the hub central ring member of blade centrifugal loads. The spokes connect to the outer support at a station remote from the point of intersection of adjacent straight sides of the truss member, and preferably substantially half way between adjacent intersections. Still further, the blades are retained from the outer support member at substantially the point of intersection of adjacent straight sides of the truss member.

In accordance with still a further aspect of the present invention, the blade outer support, spokes and central ring member are fabricated and shaped so that a failure of the outer support, or of one of the spokes, will not prevent the rotor head from performing its normal function of carrying blade centrifugal loading, rotor torque loading, rotor thrust loading and rotor head moment forces.

It is a very important feature of this invention to provide a rotor hub having a truss shaped outer member connected to the hub inner member through radially extending spokes wherein the spokes and inner hub member are unloaded from centrifugal loading by the outer truss member until such time as the outer truss or support member suffers a failure.

Other objects and advantages of the present invention may be seen by referring to the following description and claims, read in conjunction with the accompanying drawings.

DESCRIPTION OF THE PREFERRED EMBODIMENT

Figure 1:
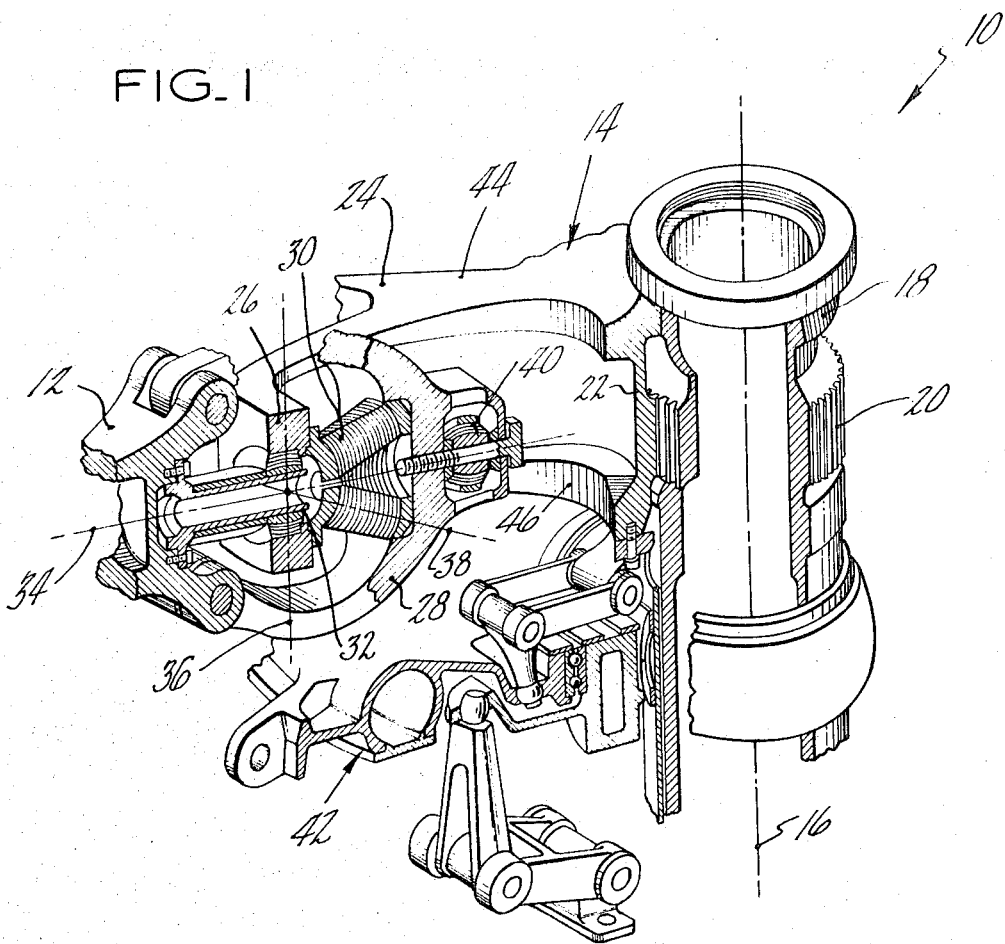
FIG. 1 is a partially broken away showing in perspective of a helicopter rotor head utilizing our redundant load carrying hub construction.

Referring to FIG. 1 we see helicopter rotor 10 which includes a plurality of blades 12 supported from rotor hub 14 for rotation therewith about axis of rotation 16. Rotor drive shaft 18 is mounted for rotation about axis 16 by conventional bearing supports and is driven in rotation by a conventional engine through a conventional transmission system, and includes spline 20 which engages a corresponding spline on the central ring member 22 of hub 14. A plurality of spoke members 24 project substantially radially out from hub central ring member 22 and support hub outer support 26 from their outer ends. Blade 12 is connected to blade retaining yoke 28, which cooperates with spokes 24 and outer support 26 to define interlocked looped members which support spherical elastomeric bearing 30 therebetween. Bearing 30, with the cooperation of centering bearing 32, serves to support blade 12 from hub 14 for universal motion about the intersection of blade pitch change axis 34, blade lead-lag axis 36 and blade flapping axis 38.

A conventional lead-lag damper (not shown) is connected to yoke 28 through bearing 40 in known fashion. Conventional swashplate mechanism 42 is mounted on drive shaft 18 and connected to blade 12 through a conventional blade pitch horn (not shown), operating in conventional fashion to cause blades 12 to vary in pitch both cyclically and collectively.

It should be noted by viewing FIG. 1 that spokes 24 are formed from upper flange member 44 and lower flange member 46, which are connected to and project outwardly from central hub member 22 so that hub 14 is actually a one piece, integral unit.

Figure 2:
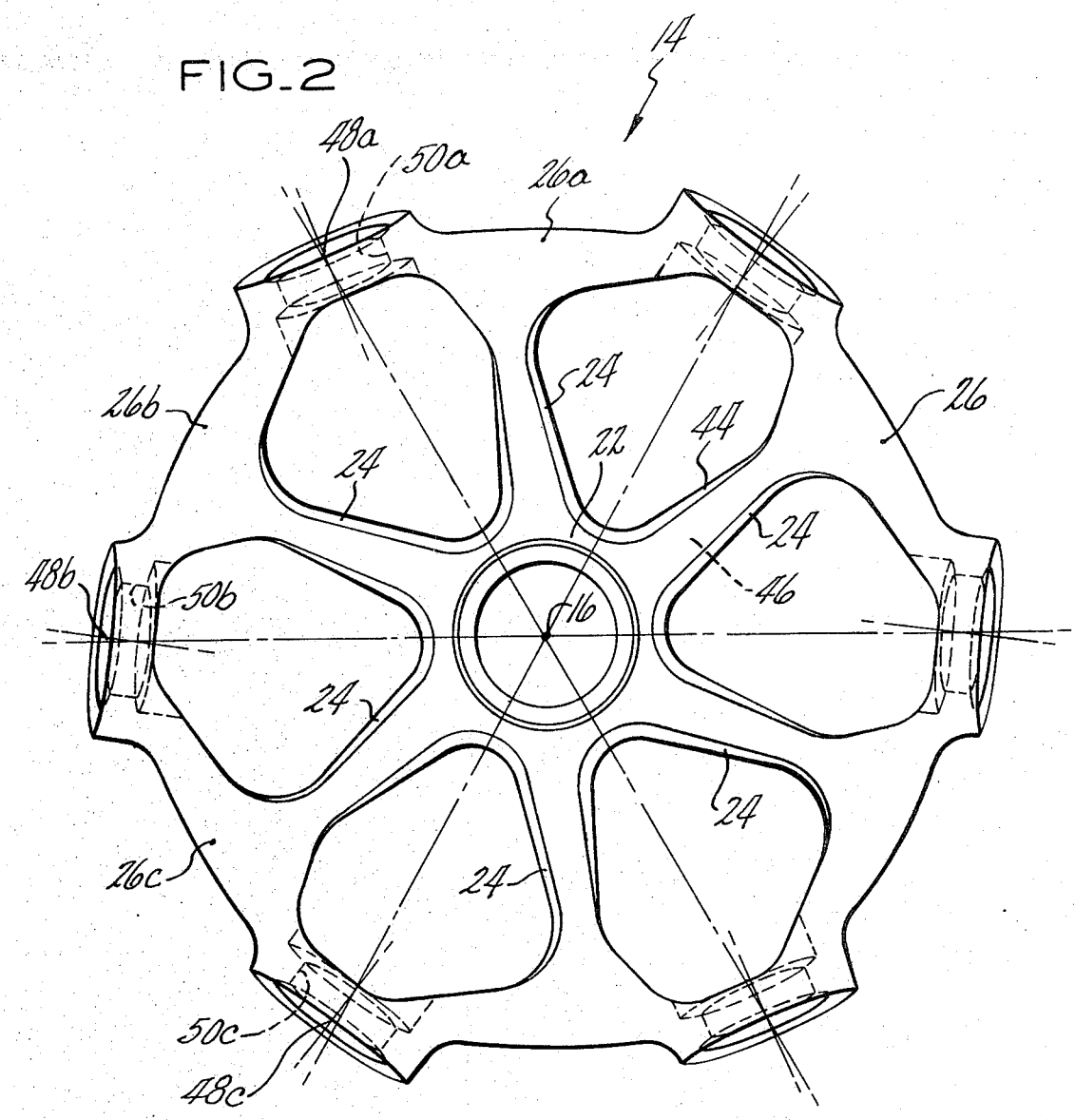
FIG. 2 is a top view of a rotor hub made according to our invention.

Hub 14 is shown in greater particularity in FIG. 2. Hub central member 22 is shown to have axially extending splines 46 on its inner diameter and, together with the remainder of the hub 14, is concentric about axis of rotation 16. Spokes 24 project substantially radially from inner member 22 and attach to outer support member 26 so that hub 14 is an integral unit. Outer support member 26 is actually fabricated as a truss member comprising a plurality of straight sides 26a, 26b and 26c, for example, which are joined at substantially the apex of the intersecting straight sides, such as 48a, 48b and 48c. Apertures such as 50a, 50b and 50c in member 26 at intersection 48 receive and support blade centering bearing 32 (see FIG. 1). By viewing FIGS. 1 and 2, it will accordingly be seen that hub central member 20 is actually a sleeve member of circular cross section mounted concentrically about axis 16, that spokes 24 are actually formed in both the upper flange member 44 and the lower flange member 46, and that outer support 26 extends between these flange members 44 and 46.

It is important to note that outer support member 26 of hub 14 consists of a series of straight sided members joined to form a symmetric, plural-sided truss member, and while six such sides are shown in FIG. 2, it should be borne in mind that any number of sides could so cooperate, with as few as three sides if a three bladed rotor is to be used. It will further be noted by viewing FIG. 2 that the blades 12 (see FIG. 1) are to be attached to the outer support member 26 at the apexes or points of intersection 48 of the straight sided members 26a, 26b, 26c, etc. and that spokes 24 are connected to the outer support member 26 at stations remote from said apexes 48, and preferably substantially midway between adjacent apexes 48. This construction is very important for the reasons to be described hereinafter.

Figure 3:
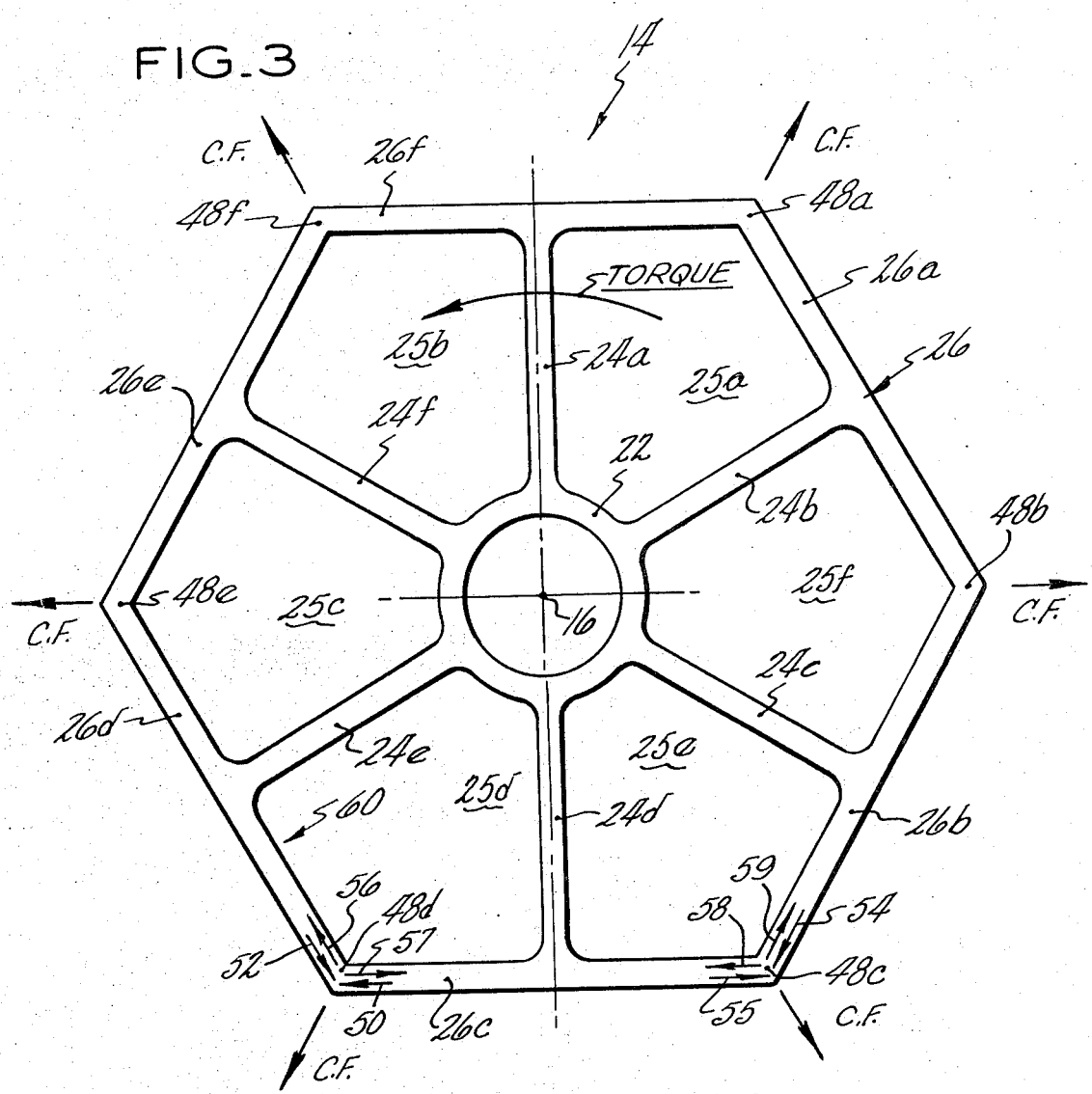
FIG. 3 is a schematic top view of a rotor hub made according to our invention for the purpose of illustrating the forces acting thereon and being reacted thereby.

For an explanation of the types of loads which a rotor hub must withstand and for an explanation of how the hub construction taught herein reacts these loads during normal rotor operation and following hub failure in redundant operation, consideration will now be given to FIGS. 3 and 4 of the drawings. First, let us consider the four types of loads which hub 14 must react between blades 12 and drive shaft 18. The first force, centrifugal force, is the force imparted to the hub by the blade due to centrifugal force attempting to throw the blade outwardly from the hub during rotor rotation. These loads are substantially radial in direction and, because blades 12 are positioned at stations 48, the loads of centrifugal force, designated by the arrows $C_F$ in FIG. 3, act at points 48 in a radial direction. The second load is called torque and is brought about by the inertia of the blade in attempting to lag behind the rotor during rotor start-up or attempting to lead the rotor during rotor braking operation, and at other times during rotor operation. This force is indicated by the arrow marked "torque" in FIG. 3. The third load is called thrust and is a vertical loading imposed upon the rotor hub by the lifting force of the blade and is indicated by arrows so marked in FIG. 4. The fourth load is called the rotor head moment and is caused by the difference in lifting potential between the faster traveling advancing blades and the slower traveling retreating blades and is indicated by the arrow marked in FIG. 4.

We will now consider how these four loads act upon rotor hub 14 and are reacted thereby in normal operation and following hub fracture wherein the redundant load carrying operation takes place. It is a very important teaching of our invention that outer support 26 take all of the centrifugal load of hub 14 so as to free spokes 24 and inner hub member 22 thereof. Inner hub 22 has many other steady-state forces and loads which it must carry and its size may be reduced and its structural integrity increased if outer support 26 can react all blade centrifugal loading for hub 14. Let us consider the effect of centrifugal force $C_F$ at intersection or apex 48d between straight sides 26c and 26d of outer support member 26. The centrifugal force load vector $C_F$ at intersection 48d loads straight legs 26c and 26d equally and in opposite directions as shown by arrows 50 and 52, which illustrate that one half of the blade centrifugal force $C_F$ at station 48d is taken by leg 26c and half thereof is taken by leg 26d. Similar loads 54 and 55 are imposed at intersection 48c by centrifugal force $C_F$ of the blade there, and it will be noted that forces 50 and 55 are in opposite directions on straight leg 26c, thereby placing that leg in tension. Since similar forces act upon each succeeding leg 26a–26f, the entire outer support or truss member 26 is loaded in hoop tension so as to carry all of the blade centrifugal loading therein, without having to impart any thereof through spokes 24a–24f to hub central member 22. Outer member 26 reaction of centrifugal load forces 50–55 are indicated by arrows 56–59. It is an important teaching of our invention that outer member 26 be straight sided so as to form a truss so that these blade centrifugal loads and reactions shown by arrows in FIG. 3 are directed in straight-line action therealong so that truss member 26 retains its shape while carrying these discretely positioned and heavy blade centrifugal loads. If member 26 were circular in form or other curved shape, the centrifugal blade loads would react in bending in directions upon the circular outer member 26 that they would tend to pull the circular member 26 out-of-round and hence, member 26 would have to be beefed-up substantially, as in the prior art, to withstand centrifugal loading. It will further be seen that during normal rotor operation, hub 14 reacts blade centrifugal loading so that each straight sided member 26a–26f carries and reacts one half of the centrifugal load imposed by the blade at each of its opposite ends, thereby placing the legs of truss member 26 in tension and the entire truss member 26 in hoop tension.

Now let us consider the redundant operation of hub 14 in reacting centrifugal loads when a fracture occurs in outer member 26. Let us presume in viewing FIG. 3 that a fracture occurs in outer member 26 at station 60. Such a fracture at station 60 in outer straight leg 26d would set up a counter-clockwise cantilevered load in leg 26c about intersection 48c and would therefore impose centrifugal loading upon spoke 24d and central member 22. Similarly, a clockwise cantilevered load would be imposed upon straight leg 26d about intersection 48e and thereby impose centrifugal loading upon spoke 24e and hub central member 22. It is therefore seen that if a fracture occurs in one of the straight sides of outer member 26, the centrifugal loading is imparted through the adjacent spokes thereof to central member 22. In practice, a fracture in outer member 26 at station 60 would not only impart centrifugal loading to spokes 24d and 24e but would less significantly impart centrifugal loading to the remaining spokes as well.

From a redundancy standpoint, since all centrifugal loading is taken by outer member 26, a fracture in any of the spokes 24a–24f or central member 22 is tolerable with respect to the reacting of blade centrifugal loads.

Now considering how rotor 14 reacts torque loading, it should be noted that the reacting of torque loading is the main purpose of spokes 24a–24f. For example, during rotor start-up operation, the drive engine is causing central shaft 18 to rotate and, shaft 18 is, in turn, causing inner hub member 22 to rotate therewith. This torque loading is imparted through spokes 24a–24f to the outer truss member 26 so as to carry the blades 12 along therewith. Accordingly, spokes 24a through 24f share torque loading substantially equally during normal rotor operation. In the event of fracture of one or more of the spokes, the remaining spokes cooperate to carry torque loading substantially equally. A fracture in the outer truss member 26 would be immaterial from the torque loading standpoint, since torque would be applied from the radial spokes to the outer truss member 26 on both sides of the fracture. Specifically, at fracture 60 radial spoke 24d would carry torque loading to intersection 48d.

Figure 4:
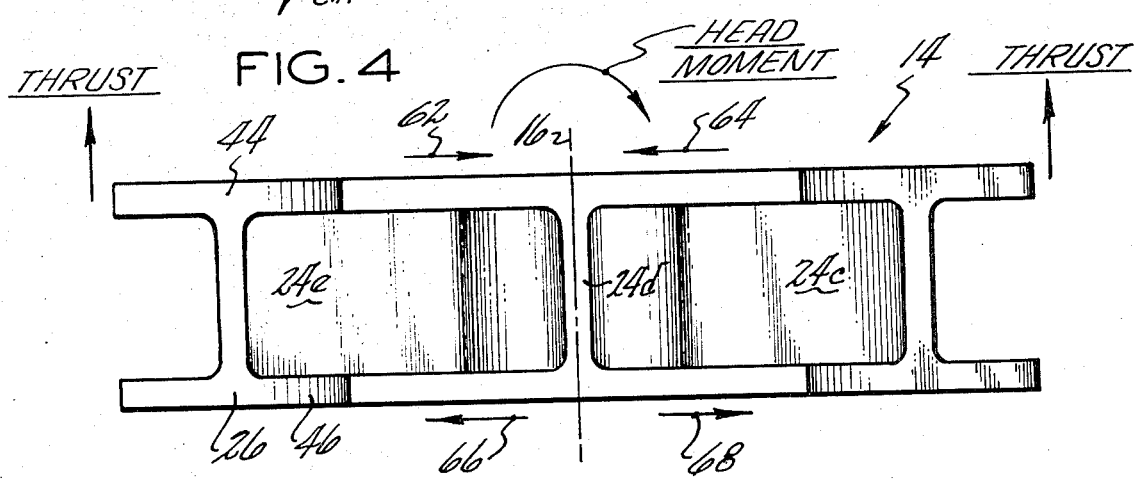
FIG. 4 is a side view of the FIG. 3 schematic rotor head.

Now, considering how hub 14 reacts thrust loading, let us consider FIG. 4. As previously described, thrust loading is a vertical loading imposed upon hub 14 due to blade lift forces as shown by the thrust arrows in FIG. 4. During normal rotor operation, such thrust loading would be reacted in the rotor hub 14 by placing the upper surface or flange 44 thereof in compression, as shown by arrows 62 and 64, and placing the lower surface or flange 46 thereof in tension as shown by arrows 66 and 68. Now, let us consider that a fracture occurs in outer truss member 26 at station 60 in straight side 26d. The blade at intersection 48a would be imposing an upward force at station 48a, and such force would be imposing a cantilevered moment on arm 26c, and also on spoke 24d so as to place the upper surfaces thereof in compression and the lower surfaces thereof in tension. At the same time, the blade at station 48e is lifting upwardly and would impose a cantilevered moment on straight side 26a and spoke 24e so as to place the upper surfaces in compression and the lower surfaces in tension. The remainder of the thrust load from the blade at station 48e would be imparted in cantilevered fashion to straight side 26e and spoke 24f so as to place their upper surfaces in compression and lower surfaces in tension.

Now let us consider the head moment force, bearing in mind that this force is caused by the different lifting capability of the blades and is actually an overturning moment between the blades and the central hub caused by this different blade lifting performance. We must consider this head moment as an attempt for the entire rotor to bend drive shaft 18 through the central hub ring 22. Accordingly, spokes 24a–24f are the structures which are going to react this overturning moment by having their upper surfaces placed in compression and their lower surfaces placed in tension to absorb or react this head moment loading. To demonstrate the redundant capability of our rotor construction 14 shown in FIG. 3, let us assume that during operation, spoke 24e fractures. Under these circumstances, the blade at station 48e will impose a lifting moment so as to place the upper surface of straight side 26e and spoke 24f in compression and their lower surfaces in tension. The blade at station 48e will also apply similar loading to straight sides 26a and 26c and will apply a twisting loading on spoke 24d. In this way, our rotor hub 14 will redundantly react head moment loading when spoke 24e fractures.

It is an important teaching of our invention that spokes 24a–24f are joined to outer truss member 26 at stations approaching perpendicularity to it and remote from side member intersections 48a–48f so as to be free of the influence of blade centrifugal force. Preferably, the spokes are positioned substantially midway between adjacent intersection stations 48a–48f and this provides the added advantage of providing substantial space envelopes 25a–25f to receive the blade support structures 26–40 shown in FIG. 1. If spokes 24a–24f were in substantial alignment with the blades 12 at points of intersection 48a–48f, or tangentially parallel to truss member 26, the blade centrifugal loading would be at least partially imparted thereto and this would be completely contradictory to the purpose and teaching of this invention, in that our objective is to have all centrifugal loads taken by the outer truss member 26 only and the spokes 24 to be fully relieved of centrifugal loading. The major advantage to be gained by relieving the spokes 24 of centrifugal loading is that, in turn, the hub inner ring member 22 is also relieved of centrifugal loading and this is desirable practice since inner ring 22 is a heavily stressed and loaded structure which has many other loads to carry and whose reliability will be increased if relieved of the centrifugal loading. An alternative construction would have been to beef-up the inner ring 22 and the radial spokes 24 sufficiently so as to be able to carry all of the loads imposed thereon, including the centrifugal loading, and thereby eliminate outer truss member 26, however, this alternate structure would not produce a redundant load carrying structure. It will therefore be seen that the utilization of the outer truss member 26 not only gives redundancy to our hub, but relieves the inner hub member 22 of centrifugal loading so that it can better carry the loads imposed upon it by its other required functions, including carrying torque and thrust loads.

While rotor 10 has been described as a conventional main helicopter rotor, our invention is equally applicable to a helicopter tail rotor, and any rotor without respect to its attitude of orientation.

We wish it to be understood that we do not desire to be limited to the exact details of construction shown and described, for obvious modifications will occur to a person skilled in the art.

We claim:

1. A helicopter rotor adapted to support a plurality of helicopter blades from a hub member for rotation therewith about an axis of rotation and wherein said hub member includes:
   A. a central support member adapted to be driven in rotation about said axis of rotation,
   B. an outer support member surrounding said central support member and comprising a plurality of straight members positioned about said axis of rotation and connected to form a multi-sided, continuous truss member with adjacent straight members forming apex intersections at their point of connection,
   C. a plurality of radially extending spoke members extending from said central member to said outer member and connected to each and with each spoke connected to said outer member at a station between adjacent apex intersection, and
   D. means to support helicopter blades connected to and supported from said outer member at one or more of said apex intersections.

2. A rotor according to claim 1 wherein said spokes connect to said outer member at a station substantially midway between adjacent apex intersections.

3. A rotor according to claim 2 and wherein said spokes are oriented so as to connect to said straight members in substantially perpendicular fashion.

4. A rotor according to claim 1 wherein said central member, said spokes and said outer member are connected to form an integral unit.

5. A rotor according to claim 1 wherein said outer support member is in the shape of a truss having at least three sides.

6. A rotor according to claim 1 wherein said central support member is a ring member of selected height and wherein said spoke members are part of an upper and lower flange members connected to and projecting from the central member, and wherein said outer support member includes upper and lower flange members connected and supported from the upper and lower flanges of said spoke members, respectively.

7. A rotor according to claim 1 wherein said helicopter blade support means includes a bearing system including a spherical elastomeric bearing adapted to mount the blade from said hub member for universal motion about the intersection of the blade pitch change, lead-lag and flapping axes.

8. A rotor according to claim 1 wherein said spoke members constitute the sole support between said central support member and said outer support member.

9. A helicopter rotor including:
   A. a hub member having:
      1. an inner support member mounted for rotation about an axis of rotation,
      2. an outer support member enveloping said inner support member and shaped to form a multi-straight sided truss therearound,
      3. a plurality of spoke members extending between and connected to said inner member and said outer member and with a spoke member connected to each straight side of said outer member at a station remote from the ends thereof, and
   B. means connected to said outer member at the point of intersection between the adjacent straight sides thereof to support a helicopter blade from each such intersection.

10. A rotor according to claim 9 wherein said spoke members are the sole support members supporting said outer member from said inner member.

* * * * *